(12) United States Patent
Noyan Bulbul et al.

(10) Patent No.: US 12,494,133 B1
(45) Date of Patent: Dec. 9, 2025

(54) ON-TIME PERFORMANCE IMPACT EVALUATION TOOL

(71) Applicant: Amazon Technologies, Inc., Seattle, WA (US)

(72) Inventors: Nilay Noyan Bulbul, Seattle, WA (US); Xiaofeng Wei, Bellevue, WA (US); Eric Johnson Schaffer, Bellevue, WA (US); Timothy Bill, Hebron, KY (US); Mark McFarland, Florence, KY (US); Na An, Bellevue, WA (US); Lingan Satkunanathan, Kirkland, WA (US); Timothy Lee Jacobs, Tempe, AZ (US); David John Michael, Dallas, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 204 days.

(21) Appl. No.: 18/228,319

(22) Filed: Jul. 31, 2023

(51) Int. Cl.
*G08G 5/34* (2025.01)
*G06Q 10/0835* (2023.01)

(52) U.S. Cl.
CPC ......... *G08G 5/34* (2025.01); *G06Q 10/08355* (2013.01)

(58) Field of Classification Search
CPC .......................... G08G 5/34; G06Q 10/08355
See application file for complete search history.

(56) References Cited

U.S. PATENT DOCUMENTS

| | | | | |
|---|---|---|---|---|
| 9,953,287 B1 * | 4/2018 | McDonald, Jr. | ... | G06Q 10/0832 |
| 10,553,122 B1 * | 2/2020 | Gilboa-Amir | ..... | G06Q 10/0832 |
| 11,615,370 B1 * | 3/2023 | Li | ..................... | G06Q 10/08355 |
| | | | | 705/338 |
| 12,008,843 B2 * | 6/2024 | Harvey | .................. | G07C 5/008 |
| 12,236,374 B1 * | 2/2025 | Malshe | ............... | G06Q 10/083 |
| 2003/0093187 A1 * | 5/2003 | Walker | ............... | B64D 45/0059 |
| | | | | 701/1 |
| 2004/0034556 A1 * | 2/2004 | Matheson | ............... | B61L 27/14 |
| | | | | 705/7.24 |
| 2006/0010037 A1 * | 1/2006 | Angert | ............... | G06Q 30/0601 |
| | | | | 705/15 |
| 2015/0220865 A1 * | 8/2015 | Acuna Agost | ... | G06Q 10/06312 |
| | | | | 705/7.22 |
| 2017/0371355 A1 * | 12/2017 | Paduano | ................ | G05D 1/102 |
| 2018/0060827 A1 * | 3/2018 | Abbas | .................... | G08G 1/005 |
| 2018/0107967 A1 * | 4/2018 | Bulcao | .................. | G06Q 10/08 |

(Continued)

OTHER PUBLICATIONS

Jung Seung Rae (KR102479421B1). System and Method for Controlling Automatic Delivery Operationto Provide Lastmile Delivery Service Based on Artificialintelligence. (Year: 2022).*

*Primary Examiner* — B M M Hannan
(74) *Attorney, Agent, or Firm* — K&L Gates LLP

(57) ABSTRACT

Devices and techniques are generally described for on-time performance impact evaluation. In some examples, first flight plan data that includes a plurality of scheduled air-based routes may be determined. A first route of the plurality of scheduled air-based routes may be selected for a first package. First scan data related to the first package may be received. A first slack time associated with the first package on a first flight of the first route may be determined based at least in part on the first scan data. The first package being assigned to the first route may be evaluated based at least in part on the first slack time.

20 Claims, 7 Drawing Sheets

(56) References Cited

U.S. PATENT DOCUMENTS

| | | | |
|---|---|---|---|
| 2019/0161190 A1* | 5/2019 | Gil | E05F 15/77 |
| 2020/0019925 A1* | 1/2020 | Tokhtabaev | H04W 4/44 |
| 2020/0233411 A1* | 7/2020 | Ivanov | G08G 5/22 |
| 2022/0044198 A1* | 2/2022 | Meister | G06Q 10/0833 |
| 2022/0383757 A1* | 12/2022 | Tavshikar | G06Q 10/087 |
| 2023/0032246 A1* | 2/2023 | Kaneria | G08G 5/25 |
| 2023/0169447 A1* | 6/2023 | Vaidyanathan | G06Q 10/0838 |
| | | | 705/7.28 |
| 2023/0376884 A1* | 11/2023 | Lerner | G06Q 10/083 |
| 2023/0406499 A1* | 12/2023 | Woodworth | B64D 1/10 |
| 2024/0054415 A1* | 2/2024 | Stevens | G06Q 10/02 |
| 2024/0311750 A1* | 9/2024 | Goeters | G06Q 10/0838 |

* cited by examiner

| Leg Type | Actual Flight | Active Date | Flight Number | Flight Origin | Flight Dest | Stack Time | Actual Stack | Next Origin | Next Flight Dest | Pkgs Amount |
|---|---|---|---|---|---|---|---|---|---|---|
| SLAMMED | No | 6/15/2021 | ATN3496 | KILN | KLAX | 15 | Null | DLA9 | | 3,996 |
| | | | | | | 17 | Null | DLA7 | | 2,416 |
| | | | | | | 46 | Null | DLA3 | | 1,325 |
| | | | | | | 56 | Null | DLA8 | | 3,620 |
| | | | | | | 85 | Null | DAX7 | | 3,741 |
| | | | | | | 98 | Null | DPS1 | | 4,416 |
| | | | | | | 103 | Null | DCXB | | 1,980 |
| | | | | | | 484 | Null | DPS5 | | 3,052 |
| | | | | | | 508 | Null | DLX9 | | 2,941 |
| | | | | | | 568 | Null | KRIV | PHNL | 824 |
| | | | | | | 1455 | Null | DLA9 | | 300 |
| | | | | | | 1457 | Null | DLA7 | | 332 |

FIG. 2

| Gateway | Flow Direction | Type | SORT BANK NAME | Bank Start Time | Bank End Time |
|---|---|---|---|---|---|
| KAFW | A2G | Sort | A | 11:00 AM | 2:30 PM |
| KAFW | A2G | Sort | B | 6:45 PM | 10:30 PM |
| KAFW | A2G | Sort | C | 10:30 PM | 1:00 AM |
| KAFW | G2A | Sort | A | 4:30 AM | 8:00 AM |
| KAFW | G2A | Sort | B | 8:00 AM | 11:00 AM |
| KAFW | G2A | Sort | C | 3:30 PM | 6:45 PM |
| KAFW | G2A | Sort | D | 7:30 PM | 10:30 PM |
| KBWI | A2G | Sort | A | 10:30 AM | 2:30 PM |
| KBWI | A2G | Sort | B | 5:40 PM | 9:45 PM |
| KBWI | A2G | Sort | C | 9:45 PM | 1:30 AM |
| KBWI | G2A | Sort | A | 4:00 AM | 6:20 AM |
| KBWI | G2A | Sort | B | 6:20 AM | 10:30 AM |
| KBWI | G2A | Sort | C | 3:00 PM | 5:40 PM |

FIG. 3

ON-TIME PERFORMANCE IMPACT EVALUATION TOOL

BACKGROUND

Air-based freight typically schedules and plans flights in advance of receiving freight orders and destination information due to airport gateway constraints and Federal regulations surrounding air space and airport traffic. Lag time between planning of air-based flight routes and placement of orders necessitating inventory to be carried by such flights can cause non-optimal flight cargo usage and/or delivery delays, particularly when unscheduled flight delays occur due to a variety of unforeseen events.

BRIEF DESCRIPTION OF DRAWINGS

FIG. 2 depicts an example delivery estimate accuracy function determined in accordance with various aspects of the present disclosure.

FIG. 3 depicts an example table depicting sortation window shifts, in accordance with various aspects of the present disclosure.

DETAILED DESCRIPTION

Figure 1:
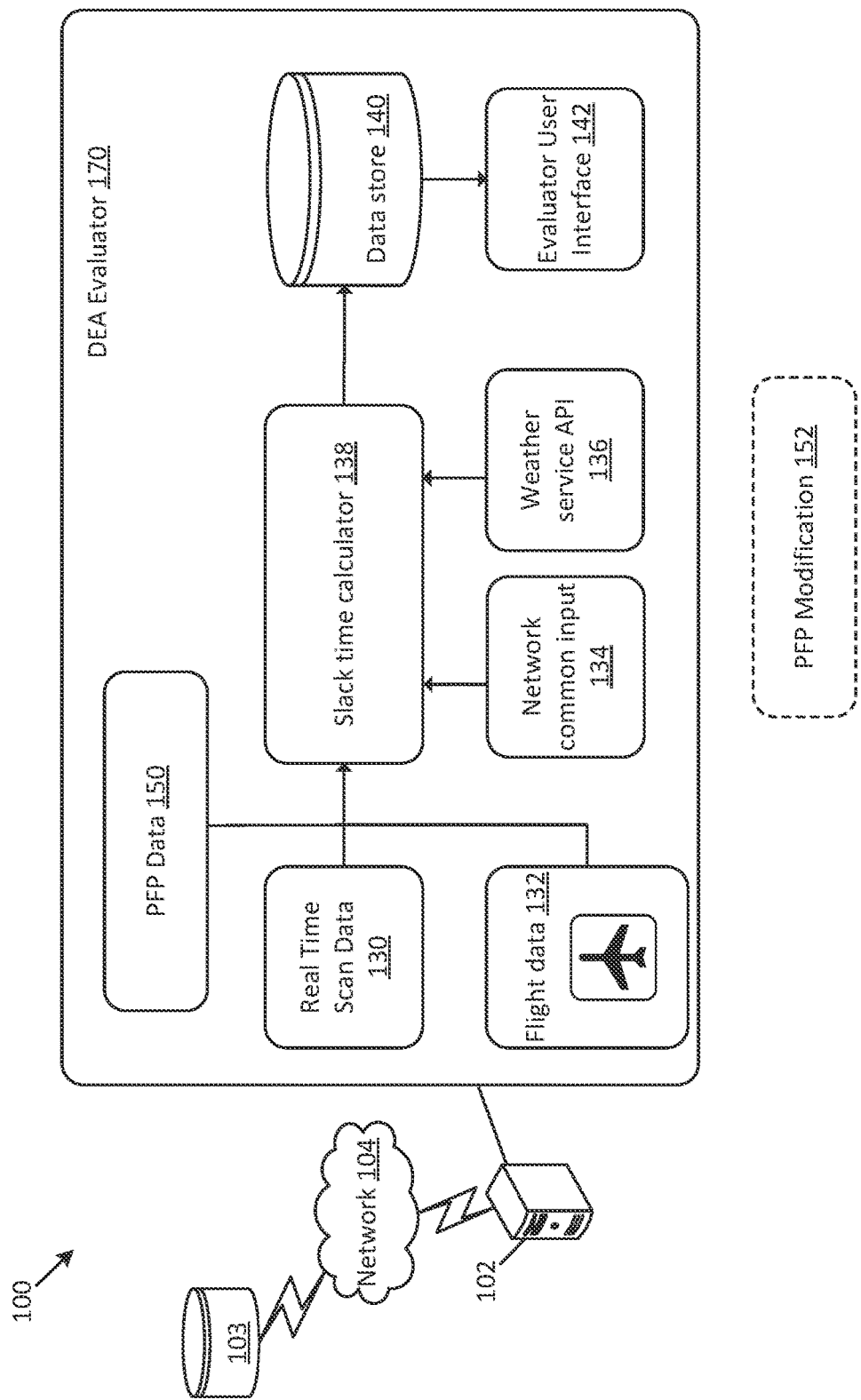
FIG. 1 is a block diagram depicting an example system effective to provide an air-based freight delivery estimate accuracy evaluation, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Use of air-based freight can speed up delivery of packages relative to use of ground-based transport (or other transportation methods) particularly when long distances need to be traversed. However, it may be difficult to plan flight scheduling since such planning typically needs to be done in advance due to logistical and regulatory reasons (e.g., rules and regulations promulgated by the Federal Aviation Administration (FAA) and/or other regulatory bodies). In many cases, flights for air freight may be scheduled and planned prior to the orders being received for items/parcels that will be loaded onto these flights. This makes it a challenging problem to optimize flight planning and package flow plan paths, more generally (including operational planning for associated delivery systems) to ensure on-time delivery (e.g., meeting scheduled delivery promises) and to optimize resource usage (e.g., to maximize cargo and prevent under-utilization of airplanes and/or other flight-based delivery systems).

Described herein are real-time Delivery Estimate Accuracy (DEA) risk assessment and decision methods and systems that may be used to assist air-based freight systems (and/or hybrid systems including various different types of delivery and/or transportation systems) in minimizing late deliveries in the face of unforeseen events (e.g., flight delays). The various DEA evaluator systems described herein may include a real-time evaluation component (including a user interface), a data pipeline to transform and ingest real-time delivery network volume data, and an automated model performance evaluation tool that may be used to track simulated DEA misses (e.g., delivery promise misses) versus actual DEA misses. The goal of various DEA evaluator methods and systems may be to support a flight planning system to make data-driven package recovery decisions when faced with irregularities in the flight schedule.

In various examples, the DEA evaluator may calculate the expected delivery estimate accuracy impact of flight delays along air-based routes using Promise Delivery Dates (PDD) of package volume, transit times between nodes (e.g., fulfillment centers, sortation facilities, connecting airports, etc.), processing times at facilities, flight departure and arrival times, and final node critical entry times (a time by which a package needs to arrive at a "last-mile" (or "final mile") facility in order to meet a promised delivery day/time) to calculate available slack times. These slack times may enable the air-based freight Network Control Center (NCC) to work backwards from the user awaiting delivery and make data-driven decisions to reduce DEA impact when network disruptions occur. In a fully on-time network, a tool like the DEA evaluator would not be necessary, as all packages would make their intended connections at each node in the network and deliver on-time to the end customer. In reality, flight delays do happen for a variety of different reasons and the DEA Evaluator provides valuable insights into the expected impact that those delays may have.

Machine learning techniques, such as those described herein, are often used to form predictions, solve problems, recognize objects in image data for classification, etc. For example, herein machine learning techniques may be used to determine whether and/or where to re-route a vehicle. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation. Generally, in machine learning, an embedding is a mapping of a discrete, categorical variable to a vector of continuous numbers. In neural networks, embeddings are often of lower dimensions relative to the data that the embeddings represent. In addition to the foregoing machine learning-based examples, reinforcement learning and/or large language models (LLMs) may be used to implement some or part of the DEA evaluator 170 (discussed in further detail below).

FIG. 1 is a block diagram depicting an example system 100 effective to provide an air-based freight DEA evaluator 170, according to various embodiments of the present disclosure. As depicted in FIG. 1, the DEA evaluator 170 may be implemented by one or more computing devices 102 (referred to hereinafter as "computing device 102"). Computing device 102 may comprise one or more processors and may include or be in communication with non-transitory computer-readable memory 103. In at least some examples, the computing device 102 may communicate with the non-transitory computer-readable memory 103 over a computer communication network 104. The non-transitory computer-readable memory 103 may store computer-executable instructions that may be used to implement, at least in part, the DEA evaluator 170. The network 104 may be a wide area network (WAN) such as the Internet (or a local area network (LAN)) depending on the particular implementation.

It should be noted that while many examples here describe air-based freight delivery systems, the various techniques and applicability of the DEA evaluator 170 are not limited to systems which employ air-based freight (or air-based freight alone). For example, a package flow (PFP data 150) may include only line-haul connections (e.g., trucks) and/or may include rail and/or maritime connections as well. Furthermore, the DEA evaluator 170 and/or the PFP data 150 may describe multi-modal systems that comprise combinations of different transportation modalities (e.g., air-based freight together with line haul and/or rail). As described in further detail below, the PFP data 150 may include timing details of connections on routes of interest.

The DEA evaluator 170 may receive package flow plan (PFP) data 150 which may be planned package flows (e.g., retrieval, sortation, transportation, and delivery) including flight plan data for airplanes (or other flight-based delivery systems, such as unmanned aerial vehicles (UAVs)) used by the carrier for air-based freight. The PFPs may be generated in advance of actually receiving many of the item orders for the packages that are ultimately delivered using the airplanes or other flight assets. For example, the PFP data 150 may be generated and sent to the DEA evaluator 170 every 3 months (or at any other desired cadence).

In addition to the PFP data 150, the DEA evaluator 170 may ingest real-time data (e.g., using an event-driven asynchronous messaging protocol) such as real time scan data 130. Real-time scan data 130 may represent time-stamped (and location-stamped) package scan information that may describe the times at which various packages assigned for delivery via aircraft have been scanned at various processing facilities. This data provides package volume flow through the air transportation network in real time. In addition, the DEA evaluator 170 may receive per-package critical entry times (e.g., the latest time at which the package must arrive at a last-mile delivery facility in order to meet a delivery promise), transit times (e.g., the time between loading onto a truck at a sortation facility until reaching an unloading dock at an airport), etc. Such data may be automatically fed into the DEA evaluator 170 from published package flow data (e.g., via an event drive architecture to which the DEA evaluator 170 subscribes). In addition, the DEA evaluator 170 may receive flight data 132 which may include flight information (e.g., real-time flight information such as flight arrival times and flight departure times, estimated delays, etc.) which may impact the PFP data 150 and/or the slack time calculation.

The slack time calculator 138 may calculate, on a per-flight basis, the slack time for different classes of packages. The slack time refers to an amount of buffer time available for meeting a given package delivery promise. After the expiration of the slack time, the package delivery promise may be unable to be met using the current delivery plan. For example, if package A (and/or a class of similarly-situated packages) has a slack time of 60 minutes, and a flight on which package A is loaded is delayed by 2 hours, the slack time has been exhausted and the package delivery promise may no longer be able to be met for package A.

The slack time calculator 138 may, for each flight leg, calculate a total late shipment function of the corresponding delay variable. This function is referred to herein as the "DEA function." FIG. 2 depicts an example DEA function table determined in accordance with various aspects of the present disclosure. The slack time calculator 138 gathers the timing inputs including the scheduled flight arrival and departure times (e.g., from PFP data 150 and/or flight data 132), critical entry times, transit times from the final gateway to final destinations, package processing times (e.g., the time to load/unload/sort, etc.), and calculates the slack/buffer times for each air-to-air (A2A) and air-to-ground (A2G) connection available in the package flow plan (PFP) of interest. Considering these slack values, it calculates a relation between the packages impacted by a flight departure delay value, providing a total late/missed shipment function of the corresponding delay variable for each flight leg. The DEA evaluator 170 focuses only on the direct and sole impact of a particular flight delay/hold time without any recovery options, which serves the purpose of predicting the DEA impact in case no recovery action is taken.

Consider an example flight from Gateway A to Gateway B that carries packages with different routes (according to the PFP data 150). For some packages, Gateway B can be the final gateway destination, connecting to various delivery stations (injection points to the last mile delivery nodes). Packages on the flight may have different slack times depending on their final destinations (and their flow paths, more generally), as illustrated in the example of FIG. 2. The configuration of package flow features flight schedules, and other timing details (critical pull times, truck departure times, etc.). At final gateways (the last gateway on the package flow route of interest), there may be truck departure times aligned with package flow. Accordingly, there may not be a continuous flow while connecting to ground transportation, as their may be a set of discrete options (e.g., 10 am truck departure and 2 pm truck departure).

In addition to the real time scan data 130, the PFP data 150, the flight data 132, the slack time calculator 138 may optionally receive network common input 134. The network common input 134 may include static information that may impact slack time. For example, if a particular gate is closed after 10 pm on weekdays and/or there are no personnel to unload a flight after 10 pm due to a shift ending, this may cause further package processing delays that may reduce slack time. The weather service API 136 may programmatically provide weather information that may be used to estimate slack time by the slack time calculator 138 by predicting weather-related delays (e.g., using a predictive machine learning model). The slack time calculator 138 may generate the DEA function (see the example in FIG. 2) using various heuristics and/or rule-based approaches. However, in some other examples, the slack time calculator 138 may generate the DEA function using a predictive machine learning model (e.g., trained using supervised learning approaches). In still other examples, a combination of rule-based calculation and predictive technologies may be used to implement the slack time calculator 138.

In real-time use cases, sortation center critical entry times may be used as targets to calculate the estimated slack times. For sortation-aware versions, sortation shift windows (see, e.g., FIG. 3). The DEA evaluator 170 can provide slack times for different target times according to the desired use case. For example, for a planning use case, slack times may be calculated based on final gateway critical pull times, which specify the truck departure times. In execution, packages may be delivered by trucks and, therefore, their departure times become relevant (CPTs). For a real time use case (e.g., where slack times may be used for re-routes, aircraft reallocation, etc.), a continuous flow may be assumed (e.g., assuming that a truck is available to leave when the packages are ready to leave the final gateway). For the planning use case, such an assumption may not be made, because the truck schedules (critical pull times) may be optimized while generating the PFP data 150.

The various slack time information and PFP data 150 may be stored by data store 140. In addition, a DEA evaluator user interface 142 may provide flight summary with bank slack time (as depicted in FIG. 2), weather alerts, DEA impact distribution view (by slack time), various filters, a DEA metrics dashboard, etc. The DEA metrics dashboard may display, for example, daily-missed delivery promises (30 day trend) for each flight lane along with reasons for delays/misses. In addition, the DEA evaluator user interface 142 may display an accuracy of the DEA evaluator 170. NCC may use the evaluator user interface 142 to modify a current PFP (PFP modification 152). Various examples are described below.

Table 200 in FIG. 2 represents a DEA function for a particular flight (Flight Number ATN3496). The PFP data 150 indicates various packages that will be carried by this flight. These packages are grouped into classes that have common calculated slack times. The number of such packages (Pkgs Amount) are also shown so that relative impact in terms of numbers of packages can be seen. Next Origin codes beginning with the letter D indicate that this node (facility) is the next node (e.g., the last mile delivery facility). Conversely, one class of packages is bound for another flight (the class of packages with Next Flight Dest as PHNL).

In an example, consider the set of package paths involving the connecting flights i and j with a slack time of two hours before the departure of the downstream flight j. Suppose that departure of flight i is delayed more than two hours, then the packages on all such paths are considered to be late, since these packages cannot catch the connecting flight j on time (according to the original departure time of flight j).

Estimating the processing times of packages on each route plays a critical role in slack calculations, and in this regard, the DEA Evaluator 170 may use a service level agreement (SLA)-based modeling approach.

Given a particular flight schedule along with the PFP data 150, a finite set of delay values may be considered to construct the corresponding DEA function (an example of which is shown in FIG. 2). Thus, the relation between the total late packages and the delay variable takes the form of a step function with a finite number of values.

Constructing DEA Functions. Let F denote the set of flights and $D_f(x)$ designate the DEA function providing the total late packages if the departure delay of flight $f \in F$ is equal to x. The step function $D_f(\cdot)$, $f \in F$ is given by the breakpoints $\bar{x}_{fk}$, $k=0, \ldots, N_f$, and their corresponding function values $\gamma_{fk}$, $k=1, \ldots, N_f$ and it is defined as follows:

$D_f(x)=0$, if $x \leq \bar{x}_{f0}$ $D_f(x)=\gamma_{f,k-1}$, if $\bar{x}_{f,k-1} < x \leq \bar{x}_{fk}$ for $k=1, \ldots, N_f$ $D_f(x)=\gamma_{f,N_f}$, if $\bar{x}_{f,N_f} < x$ Example DEA Evaluator 170 with Bank Window (Sortation Shift)-Aware Slack Calculations The following are example calculations to generate slack time calculations. However, as previously described, other implementations may use predictive machine learning modeling approaches and/or other calculations apart from those specifically described below. In various examples, predictive machine learning may be used to predict parameters used during slack time calculation. For example, predictive machine learning may be used to predict flight arrival, flight time, flight delay, package processing time, trucking transit time, etc. For sort window-aware Air-to-Ground (A2G) Slack/Buffer Calculations, the DEA evaluator 170 may take the Air-to-Ground (A2G) sortation window schedules into account at the relevant connections while calculating the slacks. This enhancement enables the A2G slack calculations to be more aligned with the operational constraints toward better DEA impact estimation. The underlying approach identifies the corresponding final destination critical entry time (CET) (sort center (SC) CET)-based latest possible sort window end time and updates the slack calculation as follows:

SC CET-based Latest Possible Sort Window End Time=The latest sort window end time such that "Sort Window End Time+Loading Time+Transit Time from the Final Gateway (GW) to Final Destination<=SC CET".

Updated Slack Value=SC CET-based Latest Possible Sort Window End time-Flight Arrival Time to Final GW-SLA-based Processing Time.

Cutoff Time-Based air-to-air (A2A) Slack Calculations: Aligned with the current practice of Network Control Center, the DEA evaluator 170 uses the user-specified cutoff times (instead of the connection bank schedules) while calculating the Air-to-Air (A2A) slacks at hubs.

Updated Slack Value=minimum (Cutoff Time-Flight Arrival Time to Final GW, SC CET-Transit Time from Final GW to Final Destination-Flight Arrival Time to Final GW-SLA-based Processing Time).

Figure 4:
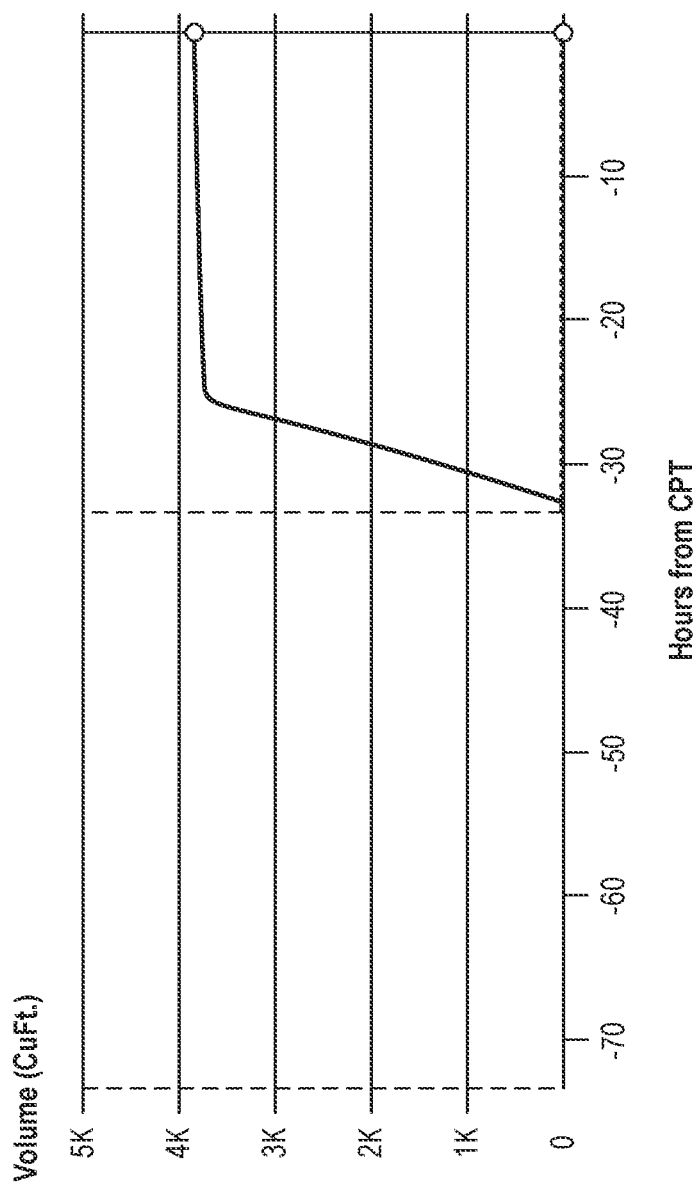
FIG. 4 depicts a plot of order volume prior to flight plan execution, in accordance with various aspects of the present disclosure.

FIG. 3 depicts an example table depicting sortation window shifts, in accordance with various aspects of the present disclosure. For this feature, the DEA evaluator 170 takes the sortation window schedules (which may also be used for package flow generation) as input. FIG. 3 depicts a partial view of sample sortation window shifts. FIG. 4 depicts a plot of order volume prior to flight plan execution, in accordance with various aspects of the present disclosure. As shown, the y-axis represents package volume, while the x-axis represents the number of hours until flight departure (with 0 being the departure time). As shown, although the flight plan (e.g., PFP data 150) may be determined months prior, nearly all package orders for the example have been placed within 40 hours of flight departure.

Example Use Case 1: Optimize the ULD Container Load and Offload Priority

A flight may have returned to blocks due to a mechanical issue and the aircraft was deemed unable to operate the flight. In this example, a spare aircraft was launched to recover the 18,182 packages loaded on the cancelled flight. However, according to the DEA evaluator 170, based on the anticipated recovery timeline, 3,234 packages bound for a first node DPD5 would fail delivery estimate accuracy after 180 minutes (e.g., slack time=180 minutes). Understanding the flight would go beyond the 180 minutes, this DEA evaluator information may be used to direct the current package location node to alter the load sequence (provided that the load sequence and position on the aircraft complies with applicable weight and balance requirements) such that the DPD5 packages into a cargo position whereby these critical shipments could be offloaded from cargo first. As a result of the changes made to the load plan and the coordination with the ramp and dock, the processing time for the at-risk volume was reduced by approximately 100 minutes.

Use Case 2: Optimize Flight Departure Prioritization at Gateway

In a different example, ramp closures at gateway KCVG required the NCC to work with the KCVG team to mitigate customer impact through the prioritization of departures based on DEA, crew limitations, and additional weather risk. KCVG advised that they would need 60 minutes to load the six remaining package classes (~3,800 pkgs) onto the KCVG-KPDX flight, GTI3736. After checking the feasibility with gateways and carrier, NCC discovered that, according to the DEA evaluator 170 and the future charge of the flight, 797 P2P packages destined for KPDX-PANC would be at risk after 42 minutes (slack time of 42 minutes), unless KPDX-PANC were able to be delayed. Again, using the DEA evaluator 170, the NCC determined that KPDX-PANC could be delayed 1,296 minutes before DEA impact. With this information, the NCC controllers coordinated with all parties to delay the KPDX-PANC flight for up to 60 minutes to capture the P2P freight. The NCC then approved the 60-minute delay on GTI3736 (KCVG-KPDX). Due to the flight delay, and DEA bucketing logic, 618 packages missed DEA and were bucketed to Air, resulting in a 97.14% External DEA (+1473 bps compared to results for an on-time departure in this scenario).

Use Case 3: Support Flight Hold Decisions

In another example, gateway KATL contacted the NCC and reported that six Inbound trucks were delayed getting docked in, and both the warehouse and the ramp were behind schedule. As a result, KATL team anticipated the need of +30 minutes on their KCVG flight (ATN3207/20) to capture ~3,500 packages. The NCC reviewed KATL Inbound Dock Manager and found that although all the trucks arrived on time, there were 4,891 packages onboard the six trucks called out by KATL, that were slammed for the current flight and would be at risk. NCC then consulted the DEA Evaluator and found that the flight could be held for up to 229 minutes before missing DEA. Because the slack time on the flight exceeded the hold request, the NCC controllers proceeded to contact all parties to assess feasibility of supporting the delay. After confirming ability to support, the NCC authorized the +30-minute delay and aligned all stakeholders with the plan. At Scheduled Departure Time, the NCC reached out to KATL for a status update and KATL advised that they would need an additional 30 minutes, for a total of 60 minutes. NCC again reviewed the flight schedule and contacted all stakeholders to assess feasibility (\autoref{fig:delay_process}). After alignment, NCC granted the additional extension and updated stakeholders. The flight departed 43 minutes late and arrived KCVG 43 minutes late. As a result of the 43-minute delay, 295 packages that missed DEA were bucketed to an air-based shipment, due to DEA bucketing logic, for a net saving of 4,596 packages.

Use Case 4: Decision Support for Spare Management.

NCC utilizes the DEA Evaluator while deciding whether or not to launch a spare aircraft to recover a disrupted flight. The DEA Evaluator provides the estimated DEA impact of alternative recovery actions, e.g., no spare launch, launching the spare at AFW which would take 3 hours to get to the gateway (GW) with disruption.

Figure 5:
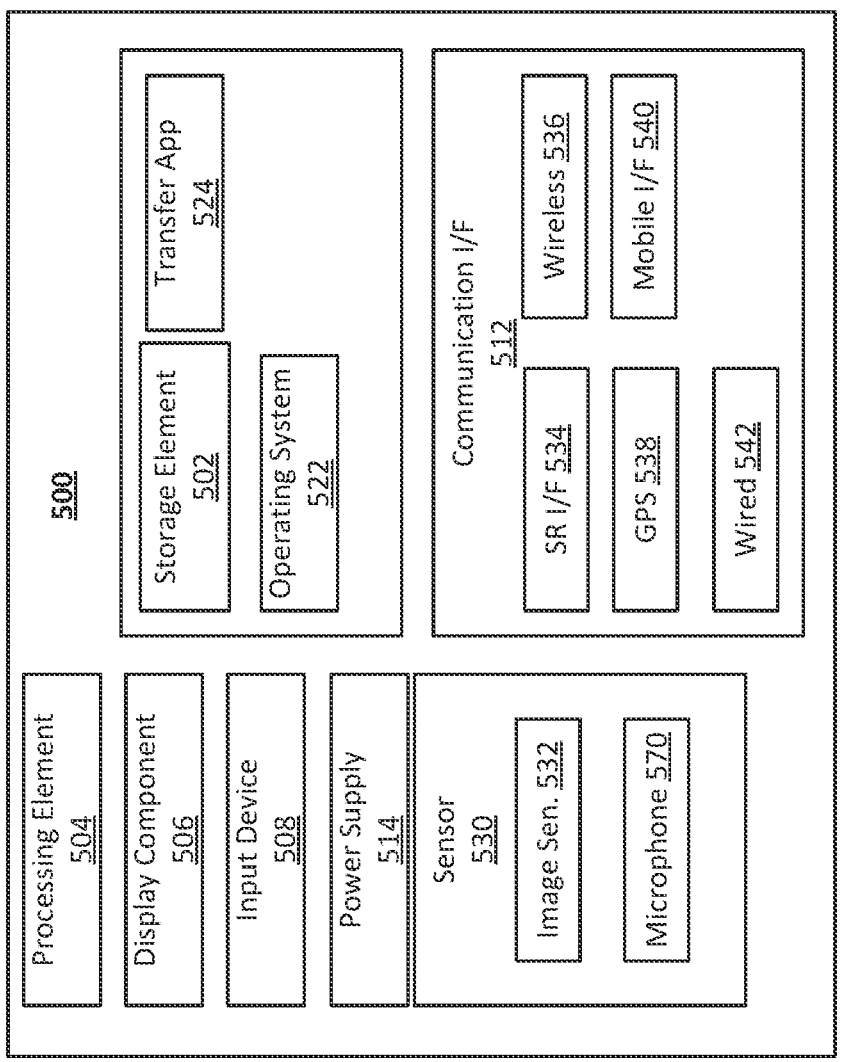
FIG. 5 is a block diagram showing an example architecture of a computing device that may be used in accordance with various embodiments described herein.

FIG. 5 is a block diagram showing an example architecture 500 of a computing device that may be used to implement (wholly or in part) the DEA evaluator 170, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, vehicle control interface, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. The sensors 530 may be configured in communication with the vehicle ECU 580. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
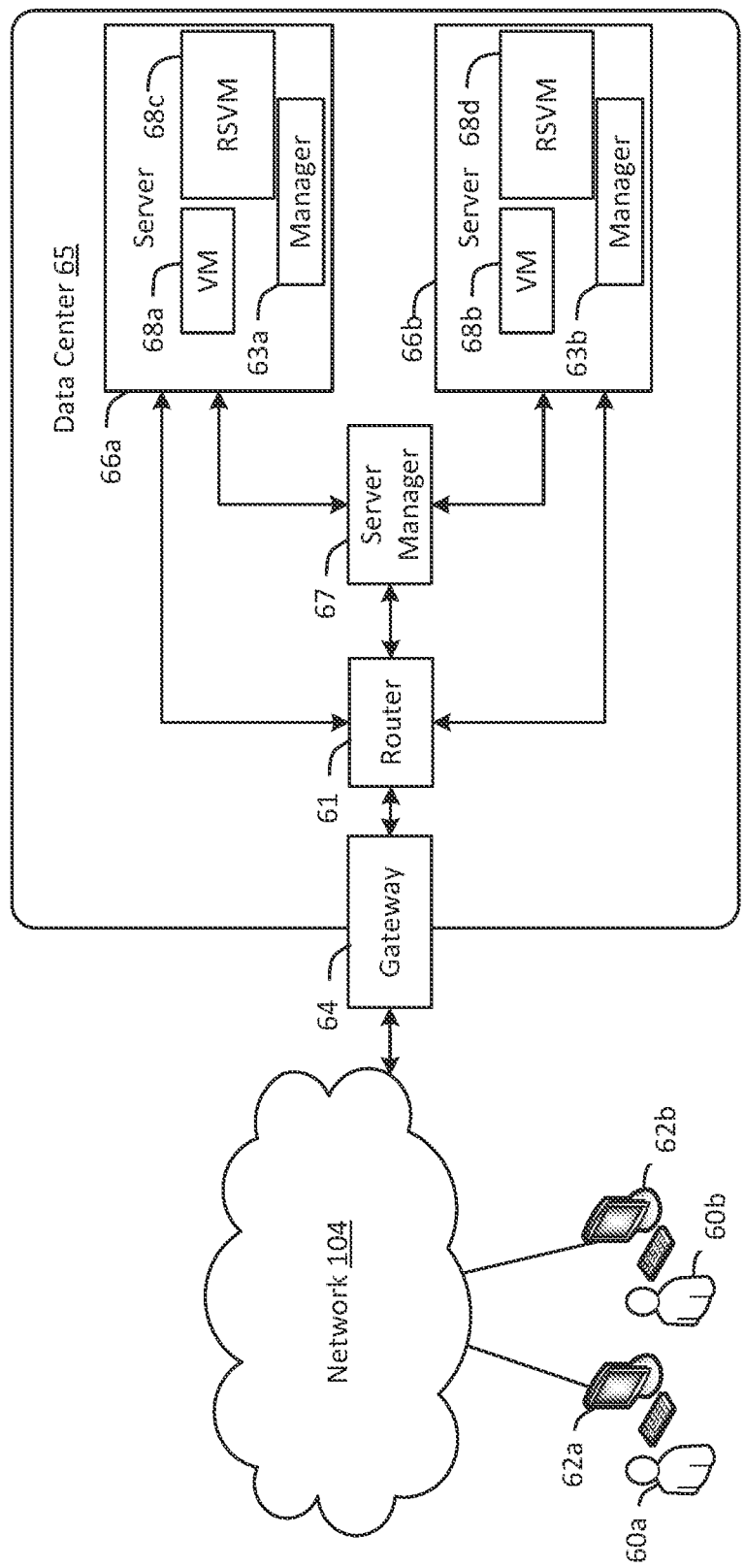
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models and/or the DEA evaluator 170 described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Figure 7:
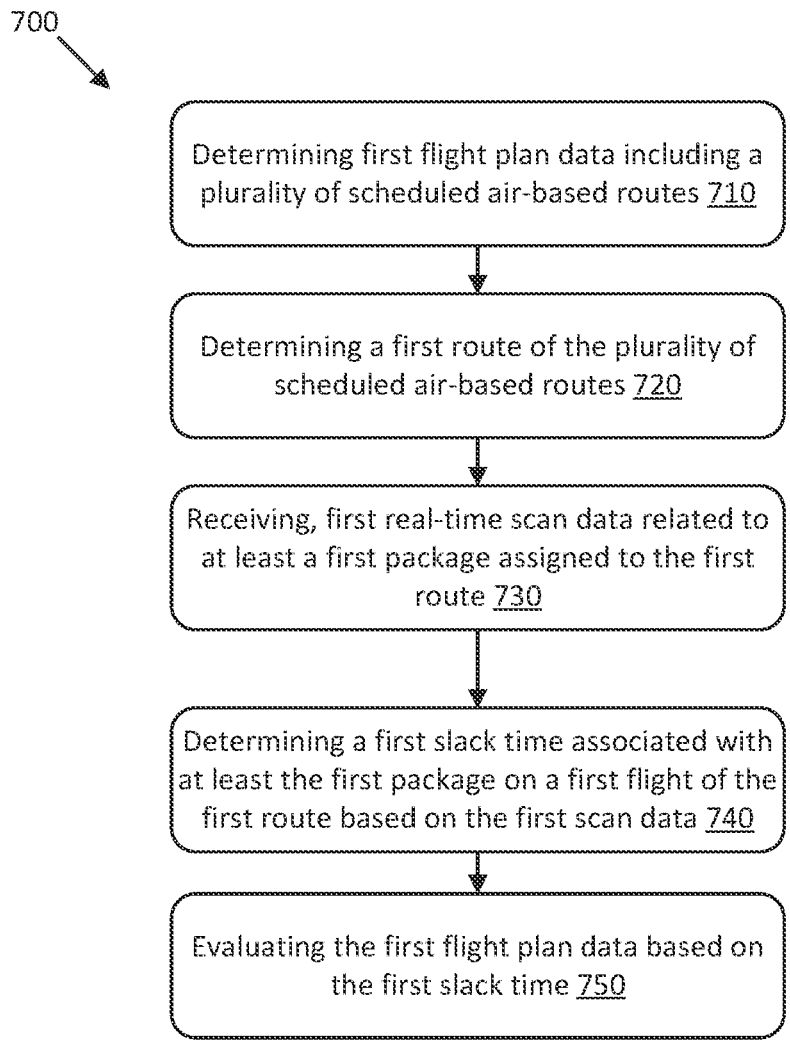
FIG. 7 depicts an example process for air-based freight delivery estimate accuracy evaluation, in accordance with various examples of the present disclosure.

FIG. 7 depicts an example process 700 for air-based freight delivery estimate accuracy evaluation, in accordance with various examples of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

The process 700 may begin at action 710, at which first flight plan data including a plurality of scheduled air-based routes may be determined. For example, the PFP data 150 may be received by the DEA evaluator 170. The PFP data 150 may be determined prior to one or more orders for packages that are loaded onto flights of the first flight plan.

Processing may continue at action 720, at which a first route of the plurality of scheduled air-based routes may be determined. In various examples, the first route may be selected for delivery estimate accuracy evaluation (e.g., by an operator).

Processing may continue at action 730, at which first real-time scan data related to at least a first package assigned to the first route may be received. In addition to the real-time scan data, various other data such as flight data 132, network common input 134, online weather data, etc., may be received by the slack time calculator 138.

At action 740, a first slack time associated with at least the first package may be determined based on the first scan data. Example slack time calculations are described above. In general, the slack time may represent an amount of buffer time by which the package may be delayed along the route and still make a promised delivery time. Processing may continue at action 750, at which the first flight plan data may be evaluated based on the first slack time. In various examples, if the first slack time is too small, an additional airplane may be allocated, the package may be re-routed, etc. In some examples, the first flight plan data may be modified by NCC.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the non-transitory, computer-readable medium and executed by the instruction execution system. In the context of the present disclosure, a "non-transitory computer-readable medium" can be any medium that can contain, store, or maintain the logic or application described herein for use by or in connection with the instruction execution system. The non-transitory computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   determining, at a first time, first flight plan data comprising a plurality of scheduled air-based routes;
   selecting a first air-based route of the plurality of scheduled air-based routes for shipping a first item, wherein the first item has a promised delivery date;
   determining, after the first time, first order data related to the first item, wherein the first order data is associated with the promised delivery date;
   receiving first data representing flight departure times and flight arrival times along the first air-based route;
   determining second data representing estimated processing time of processing nodes along the first air-based route;
   receiving third data indicating a critical entry time of a final-mile facility along the first air-based route, wherein the critical entry time is determined based on the promised delivery date;
   calculating, for a first flight along the first air-based route, a slack time associated with the first item, wherein the slack time is calculated using the first data, the second data, and the third data, and wherein the slack time represents a first amount of time, where delays that exceed the first amount of time cause a miss for the critical entry time;
   determining, based on the slack time, a first amount of time by which the first flight can be delayed;
   receiving real-time data representing a first scan associated with the first item, wherein the real-time data comprises time stamp data for the first item at a first processing location along the first air-based route;
   generating, using a predictive machine learning model and based on at least the real-time data, a predicted delay time, wherein the predictive machine learning model is trained on route data;
   determining that the predicted delay time is less than the first amount of time; and
   sending computer-executable routing instructions to cause the first flight to be delayed for a second amount of time, wherein the second amount of time is the predicted delay time.

2. The computer-implemented method of claim 1, further comprising:
   receiving the real-time data representing a scan associated with the first item at a processing facility along the first air-based route; and
   updating the slack time based on the real-time data representing the scan.

3. The computer-implemented method of claim 1, further comprising:
   sending fourth data representing the slack time associated with the first item to a delivery estimate accuracy evaluation system that generated the first flight plan data; and
   generating updated first flight plan data based at least in part on the slack time, wherein the updated first flight plan data increases the slack time associated with the first item.

4. A method, comprising:
   determining, at a first time, first flight plan data comprising a plurality of scheduled air-based routes;
   determining a first route of the plurality of scheduled air-based routes;
   receiving, over a computer-communication network, first scan data related to a first package assigned to the first route;
   determining a first slack time associated with the first package on a first flight of the first route based at least in part on the first scan data;
   receiving, over the computer-communication network, flight data indicating a delay of the first flight;
   determining, based on the flight data and the first slack time, that the first package will not arrive prior to a departure of a second flight of the first route;
   generating, during the first route and based on the flight data, an updated predicted arrival time for the first package; and
   determining a modified first route based at least in part on the first slack time and the updated predicted arrival time.

5. The method of claim 4, further comprising:
   receiving, over the computer-communication network, second scan data related to the first package, wherein the second scan data is received after the first scan data; and
   determining a second slack time associated with the first package based on the second scan data.

6. The method of claim 4, further comprising:
   determining a scheduled departure time and a scheduled arrival time for each flight of the first route, wherein the first slack time is further determined based on the scheduled departure time and the scheduled arrival time of flights of the first route.

7. The method of claim 4, further comprising:
   receiving rule-based data related to operations of processing facilities along the first route, wherein the first slack time is further determined based on constraints defined by the rule-based data.

8. The method of claim 4, further comprising:
   receiving online weather data; and
   updating the first slack time based on the online weather data.

9. The method of claim 4, further comprising:
   determining a second slack time associated with the first package on a second flight of the first route based at least in part on the first scan data, wherein the second slack time is further determined based on an arrival time of the first flight and a processing time of cargo of the first flight.

10. The method of claim 4, further comprising:
    determining a critical entry time for a processing facility along the first route; and
    determining the first slack time based at least in part on the critical entry time.

11. The method of claim 4, further comprising:
    determining a re-route of the first package on a second route of the plurality of scheduled air-based routes;

sending first data representing the first slack time associated with the first package on the first flight and the re-route to a delivery estimate accuracy evaluation system that determined the first flight plan data; and generating, by the delivery estimate accuracy evaluation system, second flight data comprising a second plurality of scheduled air-based routes based at least in part on the first data.

12. The method of claim 4, further comprising:

determining a second slack time associated with a second package on the first flight of the first route based at least in part on a second route assigned to the first package; and determining updated flight plan data based at least in part on the first slack time and the second slack time.

13. A system comprising:

at least one processor; and non-transitory computer-readable memory storing instructions that, when executed by the at least one processor are effective to:

determine, at a first time, first flight plan data comprising a plurality of scheduled air-based routes;

determine a first route of the plurality of scheduled air-based routes;

receive, over a computer-communication network, first scan data related to a first package assigned to the first route;

determine a first slack time associated with the first package on a first flight of the first route based at least in part on the first scan data;

receive, over the computer-communication network, flight data indicating a delay of the first flight;

determine, based on the flight data and the first slack time, that the first package will not arrive prior to a departure of a second flight of the first route;

generate, during the first route and based on the flight data, an updated predicted arrival time for the first package; and determine a modified first route based at least in part on the first slack time and the updated predicted arrival time.

14. The system of claim 13, the non-transitory computer-readable memory storing further instructions that, when executed by the at least one processor, are further effective to:

receive, over the computer-communication network, second scan data related to the first package, wherein the second scan data is received after the first scan data; and determine a second slack time associated with the first package based on the second scan data.

15. The system of claim 13, the non-transitory computer-readable memory storing further instructions that, when executed by the at least one processor, are further effective to:

determine a scheduled departure time and a scheduled arrival time for each flight of the first route, wherein the first slack time is further determined based on the scheduled departure time and the scheduled arrival time of flights of the first route.

16. The system of claim 13, the non-transitory computer-readable memory storing further instructions that, when executed by the at least one processor, are further effective to:

receive rule-based data related to operations of processing facilities along the first route, wherein the first slack time is further determined based on constraints defined by the rule-based data.

17. The system of claim 13, the non-transitory computer-readable memory storing further instructions that, when executed by the at least one processor, are further effective to:

receive online weather data; and update the first slack time based on the online weather data.

18. The system of claim 13, the non-transitory computer-readable memory storing further instructions that, when executed by the at least one processor, are further effective to:

determine a second slack time associated with the first package on a second flight of the first route based at least in part on the first scan data, wherein the second slack time is further determined based on an arrival time of the first flight and a processing time of cargo of the first flight.

19. The system of claim 13, the non-transitory computer-readable memory storing further instructions that, when executed by the at least one processor, are further effective to:

determine a critical entry time for a processing facility along the first route; and determine the first slack time based at least in part on the critical entry time.

20. The system of claim 13, the non-transitory computer-readable memory storing further instructions that, when executed by the at least one processor, are further effective to:

determine a re-route of the first package on a second route of the plurality of scheduled air-based routes;

send first data representing the first slack time associated with the first package on the first flight and the re-route to a delivery estimate accuracy evaluation system that determined the first flight plan data; and generate, by the delivery estimate accuracy evaluation system, second flight data comprising a second plurality of scheduled air-based routes based at least in part on the first data.

* * * * *